Feb. 22, 1944.  E. R. BERGMANN  2,342,241
DRIVE MECHANISM FOR SHAKER CONVEYERS
Filed Oct. 22, 1942  2 Sheets-Sheet 1

INVENTOR.
Ernst R. Bergmann
BY Clarence F. Poole
Attorney

Feb. 22, 1944.　　　　E. R. BERGMANN　　　　2,342,241
DRIVE MECHANISM FOR SHAKER CONVEYERS
Filed Oct. 22, 1942　　　2 Sheets-Sheet 2
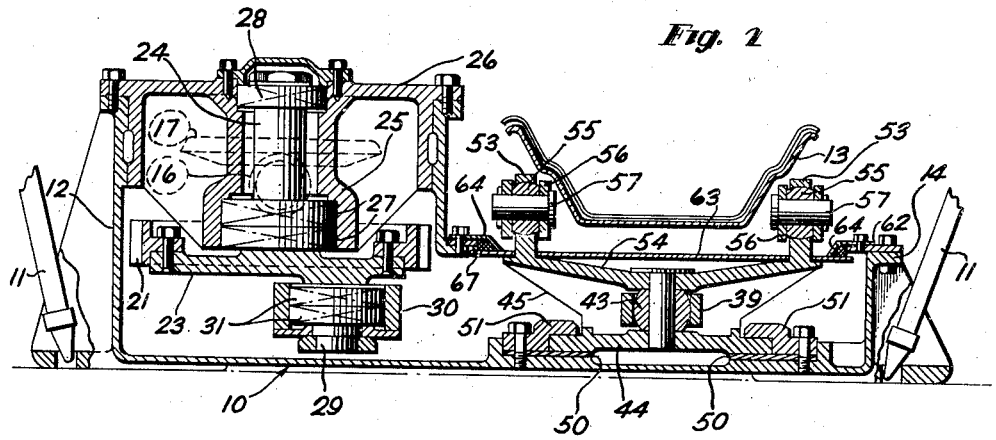
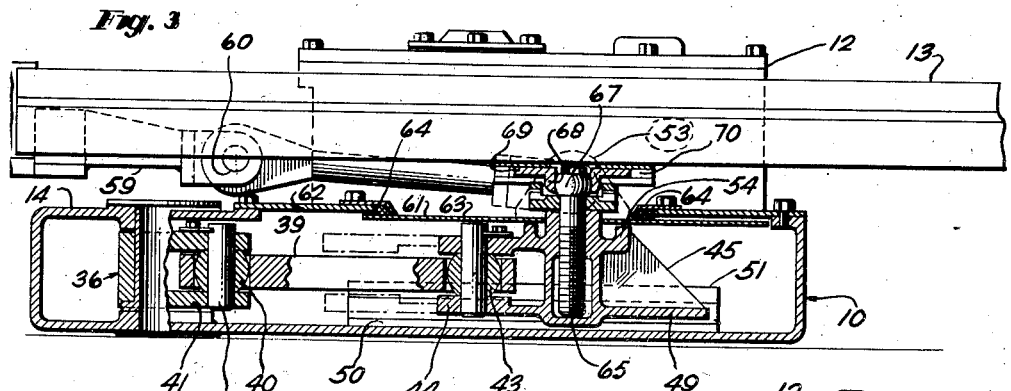
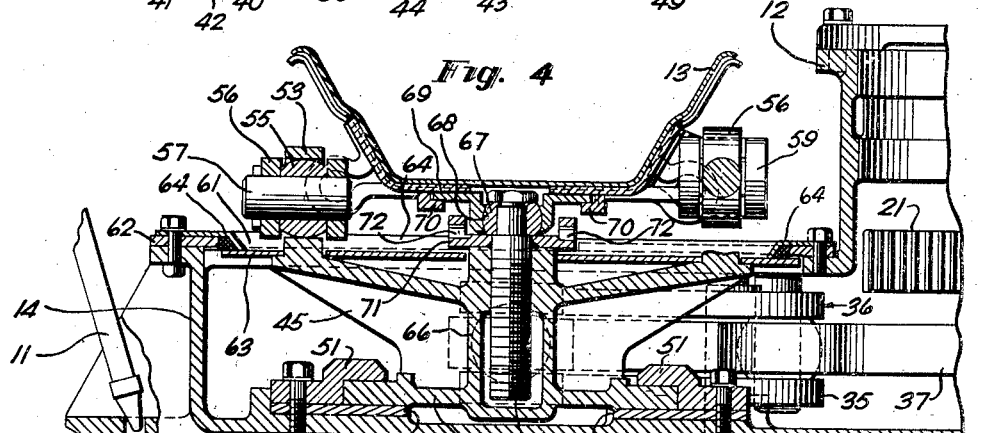
INVENTOR.
Ernst R. Bergmann
BY Clarence F. Poole
Attorney Patented Feb. 22, 1944

2,342,241

UNITED STATES PATENT OFFICE 2,342,241

DRIVE MECHANISM FOR SHAKER CONVEYERS

Ernst R. Bergmann, Evergreen Park, Ill., assignor to Goodman Manufacturing Company, Chicago, Ill., a corporation of Illinois Application October 22, 1942, Serial No. 462,910

10 Claims. (Cl. 198—220)

This invention relates to improvements in drive mechanisms for shaker conveyers of the type utilized for conveying loose material such as coal, rock, or the like in mines underground.

Among the objects of the invention are to provide a new and improved construction and arrangement of shaker conveyer drive mechanism requiring minimum vertical headroom and forming a self-aligning support as well as a drive means for a driving trough section of the conveyer.

A more specific object of my invention is to provide a novel form of vertically adjustable self-aligning support and drive means for the driving trough section of a shaker conveyer.

Other objects of my invention will appear from time to time as the following specification proceeds and with reference to the accompanying drawings wherein:

Figure 2 is a transverse sectional view taken substantially along line 2—2 of Figure 1;

Figure 3 is a substantially longitudinal sectional view taken along line 3—3 of Figure 1; and Figure 4 is an enlarged transverse sectional view taken through the self-aligning support for the driving trough section of the conveyer, and showing certain details thereof not shown in Figures 1, 2 and 3.

Figure 1:
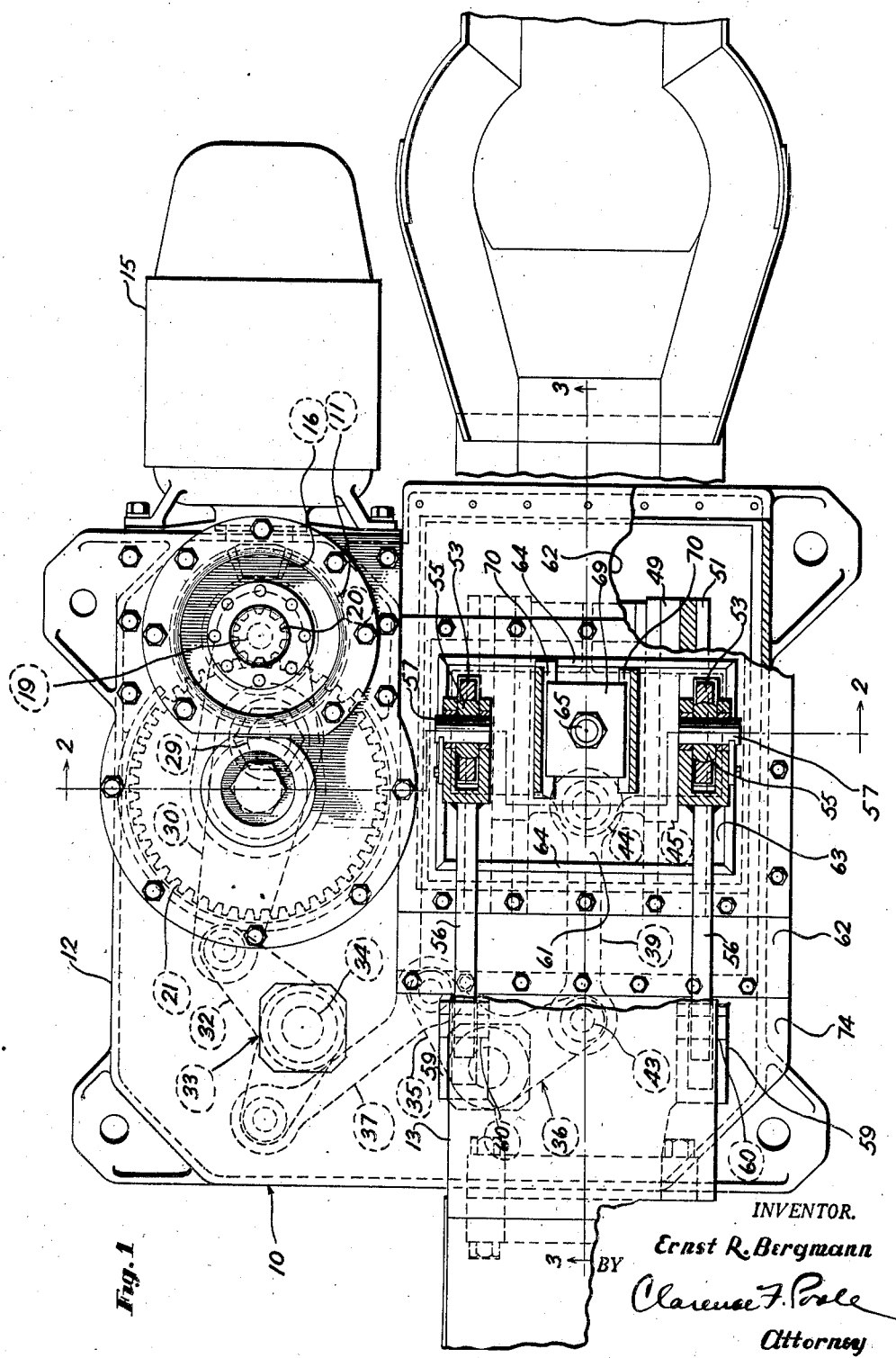
Figure 1 is a plan view of a shaker conveyer drive mechanism constructed in accordance with my invention, with parts of the driving trough and the cover for the driving mechanism broken away, and with certain other parts shown in substantially horizontal section.

Referring now to the details of the embodiment of my invention illustrated in the drawings, my improved form of drive is of the same general form as is disclosed in Patent No. Re. 21,318, the original of which issued on Dec. 31, 1935, so will only be described herein in so far as is necessary to make my present invention clearly understandable, and consists of a casing 10 which is adapted to rest on the mine floor and be suitably secured thereto, when in operation, by a plurality of holding jacks 11, 11. The casing 10 consists of a main housing 12 adapted to be positioned at one side of a driving trough section 13 of the conveyer trough line and having a reduced laterally extending portion 14 extending beneath said trough, as is clearly shown in Figures 1, 2 and 4.

The conveyer drive mechanism includes a motor 15, mounted on one of the end walls of the main housing portion 12 of the casing 10 and having a bevel armature pinion 16 which meshes with and drives a bevel gear 17, mounted on a vertical shaft 19, journaled in said main housing portion (see Figure 1). A spur pinion 20 is secured to said shaft beneath said bevel gear and meshes with and drives a spur gear 21 bolted to a disk 23, herein shown as being formed integral with the lower end of a vertical shaft 24 (see Figure 2). Said last mentioned vertical shaft is mounted in a depending bearing support 25 herein shown as being formed integral with a cover 26 for said main housing portion, on ball bearings 27, 27 and 28. A crank pin 29 is herein shown as being formed integral with said disk and as depending therefrom. A connecting rod 30 is journaled on said crank pin on ball bearings 31, 31. The end of said connecting rod opposite from said crank pin is journaled on an arm 32 of a bell crank 33. Said bell crank is journaled on a vertical shaft 34 and its other arm is operatively connected with an arm 35 of a bell crank 36 by means of a connecting link 37. The other arm of said last mentioned bell crank has a drive arm 39 journaled thereon, on a substantially ball-shaped bearing member 40, mounted between a bifurcated portion 41 of said arm on a pivotal pin 42 (see Figure 3). The opposite end of said drive arm is journaled on a substantially ball-shaped bearing member 43, mounted between the furcations of a bifurcated connecting portion 44 of a supporitng and drive member 45, which is guided in the bottom of the reduced portion 14 of said casing for rectilinear movement with respect thereto in the direction of the longitudinal axis of the conveyer trough 13.

The supporting and drive member 45 is provided with a widened base 49 which is slidably mounted, at its opposite sides, on a pair of spaced bearing strips 50, 50. A pair of laterally spaced longitudinally extending gibbed guides 51, 51 are mounted on the top surfaces of said bearing strips 50, 50 and, with the top surfaces of said bearing strips, form a rectilinear channeled gibbed guide for said supporting and drive member.

The drive connection from the supporting and drive member 45 to the conveyer trough 13 includes a pair of laterally spaced upright connecting ears 53, 53 projecting upwardly from opposite sides of an upper portion 54 of said supporting and drive member. Said upright brackets each have a substantially ball-shaped bearing member 55 journaled therein and connected to the bifurcated ends of drive links 56, 56 by means of pivotal pins 57, 57. The opposite ends of said drive links are pivotally connected to brackets 59, 59 projecting laterally from opposite sides of the trough section 13, by means of pivotal pins 60, 60, extending through said brackets and drive arms, it being noted that the axes of said pins are substantially in alignment with the bottom of said trough section.

An opening 61 is provided in a cover 62 for said reduced portion of said housing, to permit reciprocable movement of the supporting and drive member with respect to said housing. Said opening is closed by means of a reciprocably movable cover plate 63 mounted on the upper side of the upper portion 54 of said supporting and drive member. Said cover plate reciprocates with said supporting and drive member beneath the cover 62, and its top surface is overlapped by closure members 64, 64 extending along the margins of the opening 61 and inwardly and downwardly to the top side of said cover plate. Packing or a suitable bearing material may be provided between the undersides of said closure members 64 and the top of the cover plate 63.

Referring now in particular to the self-aligning supporting connection between the supporting and drive member and the conveyer trough 13, a vertical shaft 65 is threaded in a central boss 66 in said supporting and drive member and projects upwardly therefrom. Said shaft is herein shown as having a substantially ball-shaped member 67 mounted on its upper end and engaging a socket 68 formed in a depending portion of a supporting plate 69 for said conveyer trough, to permit universal movement of said trough with respect to said supporting and drive member. Said supporting plate, as herein shown, is of a rectangular outline and is guided in gibbed guides 70, 70 secured to the bottom of the trough section 13 and extending longitudinally therealong in laterally spaced relation with respect to each other. Said guides, as herein shown, are of a greater length than said supporting plate to permit said supporting plate to slide with respect to said trough so as to eliminate the necessity of accurately lining said trough with said supporting member, when setting up the conveyer, it being unnecessary to secure said trough to said plate, said plate merely acting as a center guide and support means for said trough section.

A turning member 71 is secured to the shaft 65 just beneath the ball-shaped member 67, and is provided with a plurality of apertures 72, 72, adapted to be engaged by a suitable wrench, for turning said shaft to effect vertical adjustment of said trough section.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a shaker conveyer operating mechanism, a conveyer trough, a casing extending beneath said conveyer trough, a motor, means within said casing for converting the rotatable motion of said motor to reciprocating motion including a rotatable crank, a rectilinearly guided trough supporting and driving member, and linkage connections between said crank and said rectilinearly guided trough supporting and driving member, for reciprocably driving said member, a drive connection between said rectilinearly guided member and said conveyer trough, and a self-aligning supporting connection between said rectilinearly guided member and said conveyer trough including a reciprocably driven support member on said rectilinearly guided member and having slidable supporting engagement with the bottom of said trough.

2. In a shaker conveyer operating mechanism, a conveyer trough, a casing extending beneath said conveyer trough, a motor, means within said casing for converting the rotatable motion of said motor to reciprocating motion including a rotatable crank, a rectilinearly guided trough supporting and driving member, linkage connections between said crank and said rectilinearly guided member for reciprocably driving said member, a drive connection between said rectilinearly guided member and said conveyer trough, and a vertically adjustable self-aligning supporting connection between said rectilinearly guided member and the bottom of said conveyer trough including a vertically adjustable support member on said rectilinearly guided member and having slidable supporting engagement with the bottom of said trough.

3. In a shaker conveyer operating mechanism, a conveyer trough, a casing extending beneath said conveyer trough, a motor, means within said casing for converting the rotatable motion of said motor to reciprocating motion including a rotatable crank, a rectilinearly guided trough supporting and driving member, linkage connections between said crank and said rectilinearly guided member, for reciprocably driving said member, a drive connection between said rectilinearly guided member and said conveyer trough, and a vertically adjustable self-aligning supporting connection between said rectilinearly guided member and the bottom of said conveyer trough including an adjustable member mounted on said rectilinearly guided member for reciprocable movement therewith and for vertical adjustment with respect thereto, and a support member mounted on said adjustable member for universal pivotal movement with respect thereto and having slidable supporting engagement with the bottom of said conveyer trough.

4. In a shaker conveyer operating mechanism, a conveyer trough, a casing extending beneath said conveyer trough, a motor, means within said casing for converting the rotatable motion of said motor to reciprocating motion including a rotatable crank, a rectilinearly guided trough supporting and driving member, linkage connections between said crank and said rectilinearly guided member, for reciprocably driving said member, a drive connection between said rectilinearly guided member and said conveyer trough, and a self-aligning supporting connection between said rectilinearly guided member and said conveyer trough including a substantially ball-shaped member, and a socket member mounted on said ball-shaped member for universal pivotal movement with respect thereto and having slidable supporting engagement with the bottom of said conveyer trough.

5. In a shaker conveyer operating mechanism, a conveyer trough, a casing extending beneath said conveyer trough, a motor, means within said casing for converting the rotatable motion of said motor to reciprocating motion including a rotatable crank, a rectilinearly guided trough supporting and driving member, linkage connections between said crank and said rectilinearly guided member, for reciprocably driving said member, a drive connection between said rectilinearly guided member and said conveyer trough, and a self-aligning supporting connection between said rectilinearly guided member and said conveyer trough including a substantially ball-shaped member mounted on said rectilinearly guided member for reciprocable movement therewith and for vertical adjustment with respect thereto, and a support member including a socket mounted on said ball-shaped member for universal pivotal movement with respect thereto, said member forming a support for the bottom of said conveyer trough section.

6. In a shaker conveyer operating mechanism, a conveyer trough, a casing extending beneath said conveyer trough, a motor, means within said casing for converting the rotatable motion of said motor to reciprocating motion including a rotatable crank, a rectilinearly guided trough supporting and driving member, linkage connections between said crank and said rectilinearly guided member, for reciprocably driving said member, a drive connection between said rectilinearly guided member and said conveyer trough, and a self-aligning supporting connection between said rectilinearly guided member and said conveyer trough including a substantially ball-shaped member mounted on said rectilinearly guided member for reciprocable movement therewith and for vertical adjustment with respect thereto, and a support member including a socket mounted on said ball-shaped member for universal pivotal movement with respect thereto, a longitudinal guide on the bottom of said trough section and having said support member slidably guided therein, for supporting said conveyer trough section.

7. In a self-aligning drive and support means for a shaker conveyer trough section, a base, a reciprocably driven supporting and drive member guided in said base for rectilinear movement with respect thereto, a drive connection from said supporting and drive member to said trough section, and a self-aligning supporting connection from said supporting and drive member to said trough section including a supporting member guided on the underside of said trough section for longitudinal movement with respect thereto and forming a support therefor, and a universal pivotal supporting connection between said member and supporting member.

8. In a self-aligning drive and support means for a shaker conveyer trough section, a base, a reciprocably driven supporting and drive member guided in said base for rectilinear movement with respect thereto, a drive connection from said supporting and drive member to said trough section, and a self-aligning supporting connection from said supporting and drive member to said trough section including a substantially ball-shaped member reciprocably movable with said supporting and drive member, a socket guided on the underside of said trough section for longitudinal movement with respect thereto and mounted on said ball-shaped member for universal pivotal movement with respect thereto and forming a support for said trough section on said supporting and drive member.

9. In a self-aligning drive and support means for a conveyer trough section, a base, a reciprocably driven supporting and drive member guided in said base for rectilinear movement with respect thereto, a drive connection from said supporting and drive member to said trough section, a self-aligning supporting connection from said supporting and drive member to said trough section including a supporting member guided on the underside of said trough section for longitudinal movement with respect thereto and forming a support for said trough section on said supporting and drive member, and a vertically adjustable universal pivotal supporting connection between said supporting member and said trough section.

10. In a self-aligning drive and support means for a conveyer trough section, a base, a reciprocably driven supporting and drive member guided in said base for rectilinear movement with respect thereto, a drive connection from said supporting and drive member to said trough section, a self-aligning supporting connection from said supporting and drive member to said trough section including a member threaded in said supporting and drive member for vertical adjustment thereto, and a supporting member having supporting engagement with the underside of said trough section and mounted on said member for universal pivotal movement with respect thereto, said supporting member being guided on the bottom of said trough section to render the lining up of said trough section with respect to said supporting member unnecessary when setting up the conveyer.

ERNST R. BERGMANN.